INVENTOR.
REUBEN S. KROGSTAD
VICTOR VALI
WALTER VALI

BY

*Orland M. Christensen*
ATTORNEY

United States Patent Office 3,398,287
Patented Aug. 20, 1968

3,398,287
RADIATION SENSITIVE GEOPHYSICAL STRAIN MEASURING APPARATUS
Reuben S. Krogstad and Victor Vali, Seattle, Wash., and Walter Vali, State Line, Nev.; said Krogstad and said Victor Vali assignors to The Boeing Company, Seattle, Wash., a corporation of Delaware
Filed Feb. 15, 1965, Ser. No. 432,628
5 Claims. (Cl. 250—220)

ABSTRACT OF THE DISCLOSURE

An improved method and apparatus for detecting and measuring small movements in the crust of and/or substrata of the earth are disclosed. First and second beams of radiation energy provided by one or more lasers are derived from two points on the earth and are combined to form a third beam having interference fringes therein. Any relative movement between the two points then causes a shift in the fringe pattern, thereby providing information regarding relative movement between the two points. A laser interferometer is disclosed for providing the mentioned beams. A constant density tube is preferably used in one leg of the system.

---

Figure 1:
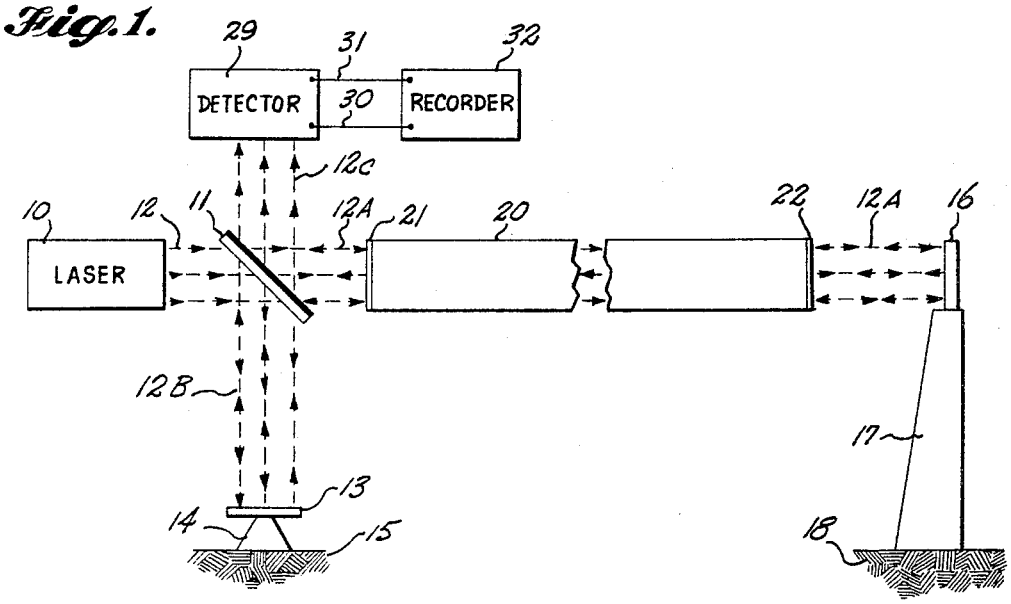

It is well known at the present time that the earth's crust and substrata are continually moving with the crust being subjected to tidal movements similar to those associated with bodies of water. The advantages of being able to detect the strain or movement in the various parts of the crust and substrata of the earth and hence to be able to obtain information of a geophysical nature are obvious, as for example the ability to predict the occurrence of earthquakes. Thus many attempts have been made with various types of equipment to obtain strain and movement information concerning the crust and substrata of the earth. In general it can be said that the prior art systems and pieces of equipment have primarily made use of mechanical sensing devices. Such mechanical devices are found in practice to be very sensitive to external changes of temperature, atmospheric pressure, and various other phenomena which impair the accuracy of the systems making use of such devices.

It is therefore an object of the present invention to provide an improved and simplified method and apparatus for detecting movement of the crust of the earth.

It is a further object of the present invention to provide an improved and highly sensitive apparatus for detecting very small relative movement between two separated points on the earth.

Another object of the present invention is to provide a simplified and accurate movement detecting apparatus for indicating the occurrence of as well as the magnitude of relative movement between two portions of the earth's crust.

Another object of the present invention is to provide a method for obtaining accurate data regarding the magnitude of movement between two separated portions of the earth's crust.

In accordance with the teachings of the present invention first and second beams of monochromatic electromagnetic radiation of identical wavelength from two separated points on the earth are combined to form a third beam having interference fringes therein. Any relative movement between the two points will then cause a change in the interference pattern. Such change is recorded and correlated with the wavelength of the radiation and position of the sources to thereby provide accurate data concerning relative movement between the two points. Since lasers provide a substantially monochromatic beam of radiation and can be made to have a great coherence distance, such devices are preferably used in accordance with the invention as the monochromatic beam source. The output beam of a single laser can be divided into two separate beams and directed against separate reflecting surfaces secured to two separated points on the earth to provide the previously mentioned beams of identical wavelength for producing the interference pattern. Thus, in accordance with one embodiment of the present invention an interferometer is essentially constructed in place on the surface of the earth with the two reflecting surfaces of the interferometer being separated and located at the two points on the earth which are to be observed for ascertaining relative movement therebetween. Using a Michelson type interferometer the system is so constructed that the length of one of the arms corresponding to the separation between the two reflecting surfaces is made substantially longer than is the second arm of the interferometer. A constant density tube is disposed in the long arm of the interferometer so that the apparatus will be substantially nonsensitive to changes in air temperature and pressure which would otherwise affect the accuracy of the system. To further improve the accuracy of the system the light path distances between the beam splitting device of the interferometer and the two reflecting surfaces in the open atmosphere are made substantially equal. The result is that a method and apparatus are provided having an improvement in sensitivity of several orders of magnitude over other devices and systems used for detection of movements and strains in the crust of the earth.

Figure 2:
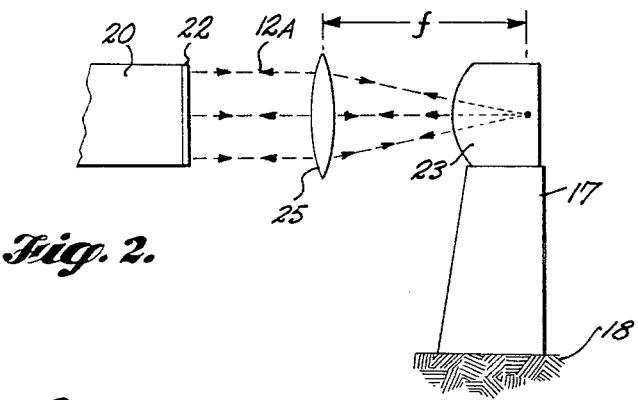
Figure 3:
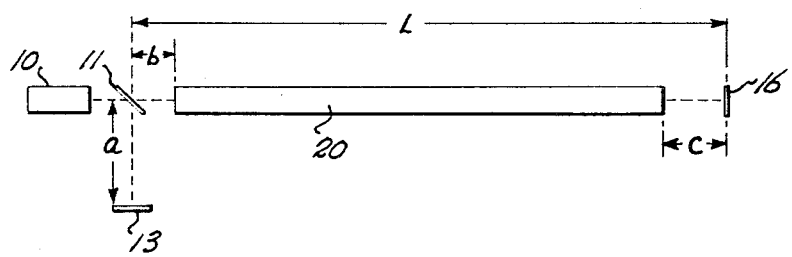

The above as well as additional advantages and objects of the present invention will be more clearly understood from the following description when read with reference to the accompanying drawing wherein, FIGURE 1 is a side view in diagrammatic form illustrating the improved apparatus of the present invention and also referred to for teaching the method of the present invention, FIGURE 2 is a side view of a preferred embodiment of the reflecting surface mounting means for one of the reflecting surfaces of the apparatus of FIGURE 1, and FIGURE 3 is a diagram illustrating with particularity an advantageous relationship of distances between various parts in the apparatus of FIGURE 1.

Referring now to the drawings and in particular to FIGURE 1 an interferometer similar to the well known Michelson interferometer is shown with a laser 10 being included therein as a source of monochromatic electromagnetic radiation having a known wavelength. Various types of lasers readily available at the present time can be used in accordance with the present invention since such devices can be made to have a very great coherence distance. A helium-neon laser with a wavelength of approximately 6328 Angstrom units provides a convenient and readily available source of coherent radiation for the system of FIGURE 1. The output parallel rays of the laser 10 impinge upon a beam splitting device 11 so that the beam of radiation (or light) 12 is split into two separate portions 12A and 12B. The beam splitting device may for example be a plate of glass with its rear side half silvered. The portion 12B reflected by the internal reflecting surface of the beam splitter 11 is directed downwardly where it impinges on the outer reflecting surface of a first reflecting member 13 which can be referred to as a mirror. The mirror 13 is adjustably secured to a stationary mount 14 which is firmly embedded in the crust or substrata of the earth at a first location 15. The other portion of the split beam shown generally at 12A is directed toward a second reflecting surface shown for purpose of illustration as a second reflecting member or mirror 16 adjustably secured to a second stationary mount 17 similarly firmly embedded in the crust or substrata of the earth at a second location 18. The mirrors 13 and 16 are so adjusted that the beam reflected from mirror 13 passes through the beam splitter 11 and recombines with the beam reflected from mirror 16 (after reflection from beam splitter 11) to form the beam 12C and results in the image of one mirror being on top of the image of the other mirror. The beam 12C then impinges on the radiation detector 29 aligned therewith. The detector can be any of a number known in the art and is adapted to provide output signals through the leads 30 and 31 to an appropriate recorder 32.

With the apparatus shown for purpose of illustration in FIGURE 1 the mirrors 13 and 16 are substantially perpendicular to each other and interference lines (or fringes) exist in the beam 12C impinging on detector 29. The interference fringes typically form a circular pattern, and the detector 29 and recorder 32 are thus readily adapted for detecting and recording the interference pattern and changes therein. The recorder may include a counter for counting the interference fringes "passing" a given point in the detector with the detector being focused on a given point of the pattern so that it will respond to changes in the interference pattern. Thus, as is well known in the art in the case of a conventional Michelson interferometer, counting the number of fringes which cross the center of the field of view of the detector 29 will provide an accurate measure of the distance the mirror 16 is moved with respect to the mirror 13. It can be shown that the distance moved is equal to the product of the number of fringes crossing the center of the field of view of the detector 29 and one half the wavelength of the monochromatic beam 12 provided by laser 10. Thus in a system making use of red light (approximately 6000 Angstrom units) a change in the separation between the reflecting surfaces 13 and 16 of $3 \times 10^{-5}$ centimeters would cause one fringe shift in the interferometer. Changes of less than one complete fringe shift are readily detected and measured.

In view of the long coherence distance for the beam from a laser, it is possible to have the mirrors or reflecting surfaces 13 and 16 of FIGURE 1 separated by a considerable distance and yet achieve the desired results. However when the reflecting surfaces 13 and 16 are thusly separated for obtaining data regarding relative movement between the sections 15 and 18 of the earth's crust it is found that changes in atmospheric pressure and temperature which take place between the mirrors 13 and 16 tend to cause a fringe shift to take place at the detector 29. The effects of such changes in atmospheric conditions are substantially eliminated in the apparatus of FIGURE 1 through the use of an enclosed elongated chamber in the form of a hollow tube 20 having optical flats 21 and 22 sealed in the ends thereof. The arrangement is such that the interior of the tube 20 remains at a substantially constant density and thus the effects of changes in atmospheric conditions are substantially eliminated. As shown diagrammatically in FIGURE 3, the length of the enclosed chamber provided by tube 20 is made sufficiently long so that the light beam 12A travels the major portion of its distance through the constant density chamber. It is preferable in practice to have the distances which the two sections of the light beam, 12A and 12B travel in the open atmosphere substantially equal. Thus referring to FIGURE 3 it is advantageous to position the parts such that the distance $a$ equals $b$ plus $c$.

With the distance L tangent to the circumference of the earth the angle $\alpha$ subtended by the distance L is equal to $L/\gamma$ where $\gamma$ is the radius of the earth. Thus it will be seen that if one considers $\alpha$ constant, $$\Delta r = \frac{r}{L} \Delta L$$

and a small change in $\gamma$ will produce a small change in L which can be accurately measured. The displacements produced by earth tides over a 10 meter distance are of the order $5 \times 10^{-5}$ cm., and therefore by eliminating to a large degree the effects of air temperature and pressure changes in the above manner, it will be seen that such earth movements can be accurately measured with the system of FIGURE 1. For example in a system where $L=10$ meters and red light of approximately $6 \times 10^{-5}$ cm. is used, a change in the earth's radius of approximately 20 cm. produces one complete fringe sheet. Considering that the distance between fringes can be measured with one percent accuracy it will be seen that changes of the earth's radius of 0.2 cm. can be measured, and further that by increasing the path length or using multiple path techniques, detection of changes of 0.2 mm. and less is readily attainable.

It is found that microseismic vibrations in the nature of noise may have a rotational component of movement which tends to misalign the iterferometer mirrors. To overcome such misalignment of the mirrors a retro-reflector, which is essentially the corner of a cube which receives light and redirects the same away from the reflector parallel to the path traveled in reaching the reflector (i.e. 180° change in direction of the light). The apparatus shown in FIGURE 2 is also found to work well in the system of FIGURE 1 for eliminating the rotational effects of microseismic vibrations. Referring to FIGURE 2 a lens 25 will be seen to be disposed between the optical flat 22 in the end of the constant density tube 20 and the right or remote reflecting surface shown as a convex mirror 23. The focal length $f$ of the lens 25 and the radius of curvature of the convex spherical mirror 23 are such that the center of curvature of the mirror and the focal point of the lens coincide. Rotation of the mirror 23 which might be caused by microseismic noise will therefore not affect the alignment of mirrors 13 and 23. Ordinary microseismic oscillations which are approximately 4 cycles per second and of 4 micron amplitude would appear as "high-frequency" noise as compared to the much longer period of earth tides.

There has thus been disclosed an improved method and apparatus for detecting and recording relative movement between two sections of the crust of the earth. The invention has been disclosed with reference to an interferometer of the Michelson type but it should be understood that various other types of interferometers, such as for example the Fabry-Perot or others known in the art per se can be adapted to the teachings of the present invention. To improve system sensitivity greater path lengths or multiple path techniques can be used to advantage. While the separation L between the mirrors of the interferometer will be a matter of choice, in one system constructed in accordance with the teachings of the present invention a separation between the mirrors 13 and 16 of approximately 10 meters has been found to provide an accurate and sensitive system.

The invention has been disclosed with reference to specific illustrated embodiments, but it is intended that those changes and modifications which will be obvious to those skilled in the art from the teachings hereof will be encompassed by the following claims:

What is claimed is:

1. Apparatus for detecting relative movement between two portions of the earth comprising in combination: a source of monochromatic electromagnetic radiation adapted to provide a first beam of radiation; beam splitting means disposed in the path of said first beam to divide said first beam into second and third separate beams; first reflecting means secured to a first portion of the earth and positioned in the path of said second beam to cause reflection of said second beam therefrom; means including second reflecting means substantially distant from said first reflecting means and independently secured to a second portion of the earth and positioned in the path of said third beam to cause reflection of said third beam and to direct the reflected third beam into coincidence with the reflected second beam to form a fourth beam; detector means positioned in the path of said fourth beam, and means defining a closed chamber disposed in the path of said third beam, the volume enclosed by said chamber being transparent to said beam and maintained at constant density.

2. Apparatus as defined in claim 1 wherein said first reflecting means is separated by a distance $a$ from said beam splitting means, said second reflecting means is separated by a distance L from said beam splitting means, and said last named means includes means defining an enclosed chamber extending for a distance substantially equal to $L-a$ in the path of said third beam between said beam splitting means and said second reflecting means.

3. Apparatus as defined in claim 1 wherein said second reflecting means is a convex mirror and said apparatus further includes a lens disposed between said mirror and said chamber in the path of said third beam adapted to focus said third beam on said mirror with the focal point of said lens being co-incident with the center of curvature of said mirror.

4. Apparatus for detecting relative movement between two sections of the earth's crust comprising in combination: first and second light reflecting members respectively independently secured to first and second sections of the earth at a substantial distance from one another; a laser adapted to provide a first beam of light; means including a beam splitter positioned in the path of said first beam and adapted to direct first and second portions of said first beam toward said first and second reflecting members, respectively, and to recombine said first and second sections after reflection from said members to form a second beam; interference pattern detecting means disposed in the path of said second beam; said beam splitter being located a distance L from said first member and a distance $a$ from said second member where L is many times greater than $a$; and means defining a closed chamber in the path of said first portion of said first beam between said beam splitter and said first member and permitting the passage of said first portion of said first beam therethrough, said last named means occupying a distance of $L-a$ in the path of said first portion of said first beam, the volume enclosed by said chamber being transparent to said beam and maintained at constant density.

5. Apparatus as defined in claim 4 and including a lens disposed between said last named means and said first member, and wherein said first member is a convex spherical mirror having its center of curvature located at the focal point of said lens.

References Cited

UNITED STATES PATENTS

| | | | |
|---|---|---|---|
| 1,625,625 | 4/1927 | Ricker | 88—14 X |
| 2,285,515 | 6/1942 | Hurley | 88—14 X |
| 2,580,498 | 1/1952 | Ackerlind | 250—234 X |
| 2,945,132 | 7/1960 | Schuch | 250—222 X |
| 3,175,093 | 3/1965 | DeLang | 250—237 |
| 3,245,307 | 4/1966 | DeLang | 88—141 |
| 3,252,110 | 5/1966 | Gustafson et al. | 88—14 |

WALTER STOLWEIN, *Primary Examiner.*